United States Patent [19]

Kubo et al.

[11] 3,717,413
[45] Feb. 20, 1973

[54] SUN SENSING SYSTEM FOR A FLYING BODY

[75] Inventors: Moritada Kubo, Tokyo; Kuniji Asano, Kawasaki; Hiromichi Ohashi, Yokohama, all of Japan

[73] Assignee: Tokyo Shibaura Electric Co., Ltd., Kawasaki-shi, Japan

[22] Filed: Nov. 20, 1970

[21] Appl. No.: 91,273

[30] Foreign Application Priority Data

Nov. 20, 1969 Japan..............................44/92639
Nov. 20, 1969 Japan..............................44/92641

[52] U.S. Cl..................356/152, 356/141, 356/147, 250/203 R, 244/1 SA, 33/61

[51] Int. Cl.............................................G01b 11/26

[58] Field of Search......356/141, 152, 138, 139, 147; 250/231 SE, 231 R, 236, 237, 233, 203 R; 244/1 SA; 33/61, 69

[56] References Cited

UNITED STATES PATENTS 3,614,239 10/1971 Kissell..............................356/152
3,440,426 4/1969 Bush...................................33/61

Primary Examiner—Benjamin A. Borchelt
Assistant Examiner—S. C. Buczinski
Attorney—Oblon, Fisher & Spivak

[57] ABSTRACT

A flying body, such as a satellite, is provided with three sun sensors mounted thereon, each of which includes a slit for allowing the sun rays to fall on a photoelectric converter mounted within the satellite. The first sensor is positioned with its slit in a plane which includes the spin axis of the flying body, the second sensor is positioned with its slit in a plane inclined at a first angle to the spin axis, and the third sensor is located with its slit in a plane inclined at a second angle to the spin axis. Logic is provided for selecting the outputs of different sensors, depending on the attitude of the satellite.

5 Claims, 18 Drawing Figures

PATENTED FEB 20 1973 3,717,413

INVENTORS
MORITADA KUBO
KUNIJI ASANO
HIROMICHI OHASHI

BY *Oblon, Fisher & Spivak*
ATTORNEYS

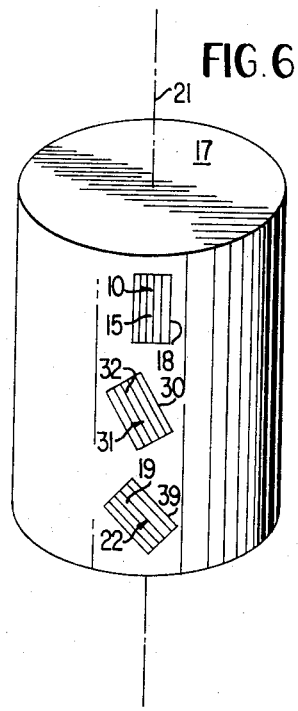
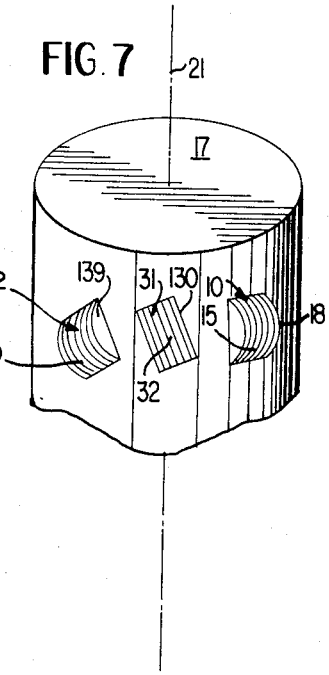
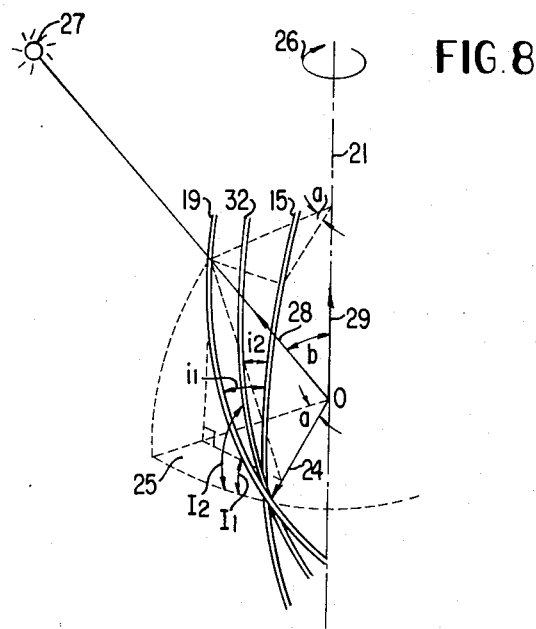

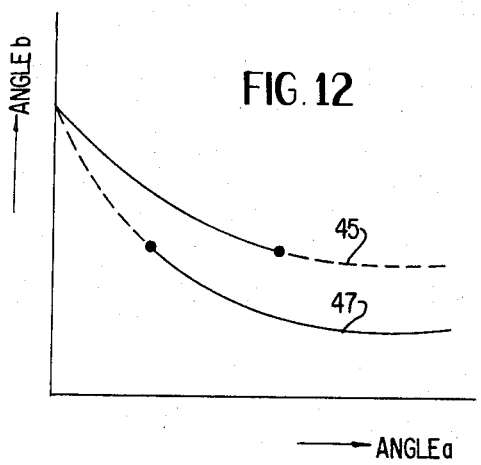
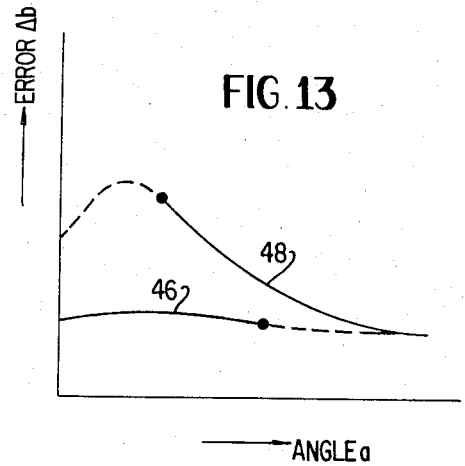
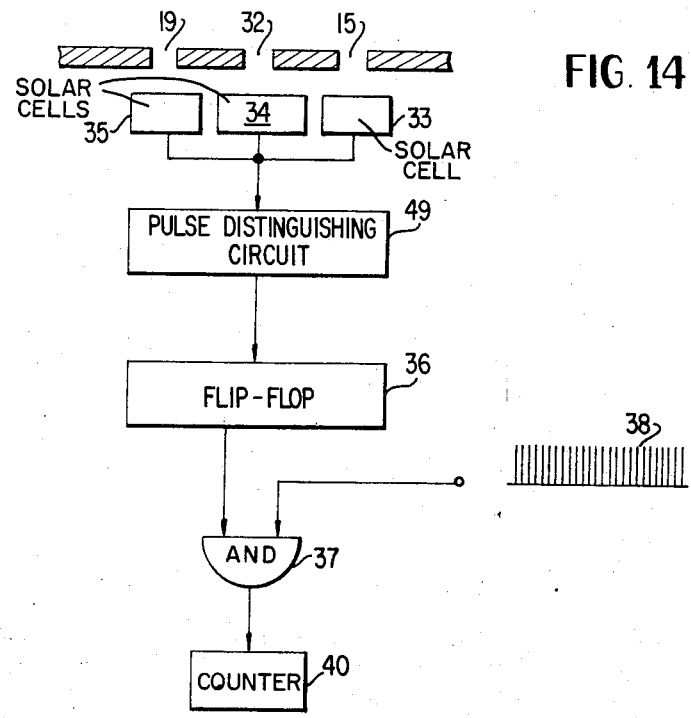

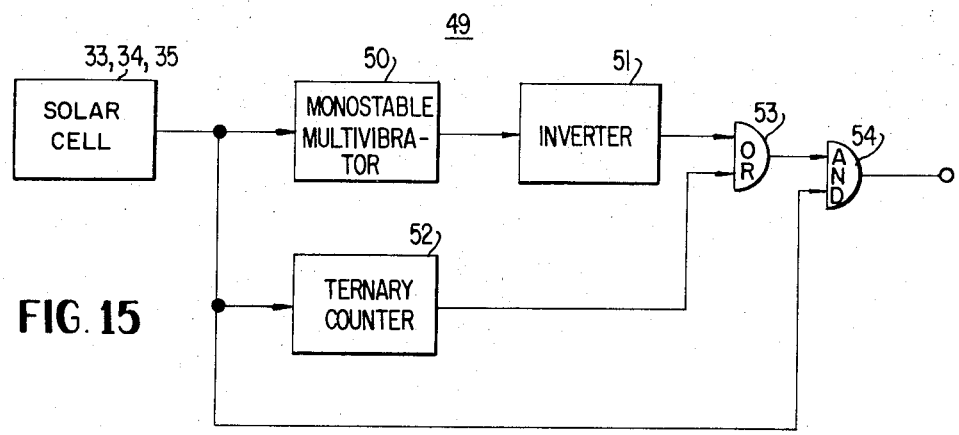
FIG. 15
FIG. 16
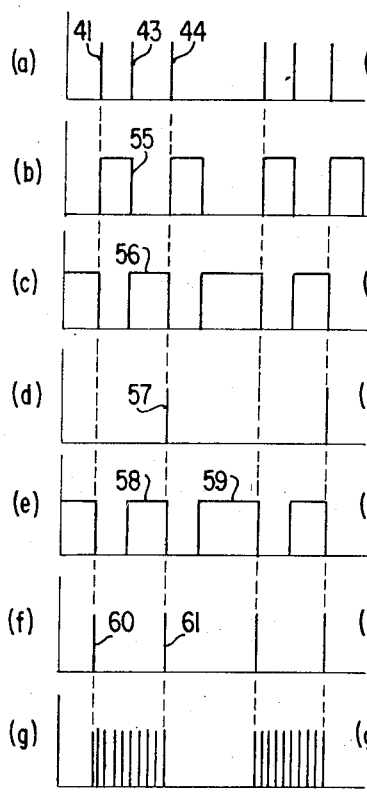
FIG. 17
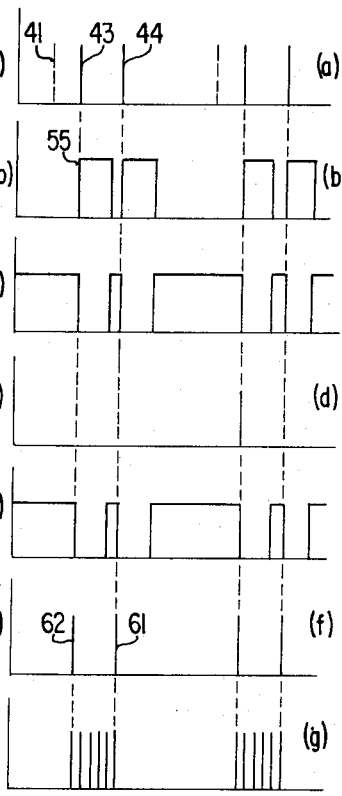
FIG. 18
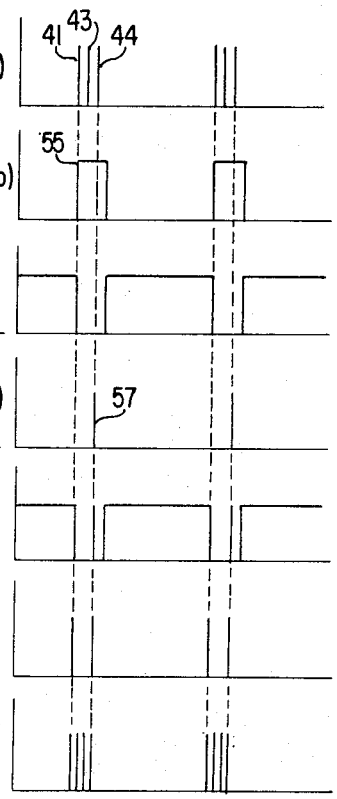

SUN SENSING SYSTEM FOR A FLYING BODY

BACKGROUND OF THE INVENTION

1. Field of the Invention

The present invention relates to a sun sensing system which may be mounted on a flying body, such, for example, as an artificial satellite, for controlling or detecting the attitude thereof.

2. Description of the Prior Art

In the past, artificial satellites were provided with pairs of sensors for controlling or detecting their attitude with respect to the sun.

In FIG. 1, an example of such a sun sensor is shown and referred to generally by the numeral 10. The sun sensor 10 is composed of a cylindrical casing 11 having a cover member 12, a cylindrical side wall 16, and a solar cell 13 positioned in a space 14 within casing 11. An annular slit 15 extends along cylindrical side wall 16 to allow the sun rays to pass therethrough and to fall upon the solar cell 13.

FIG. 2 shows an artificial satellite 17 having a side wall 20 with a pair of openings 18 and 39 therein, and a spin axis 21. Opening 18 is positioned parallel to spin axis 21 of the satellite, while the opening 39 is positioned below opening 18 and is oriented at an angle to spin axis 21.

Sun sensor 10 is mounted on the artificial satellite 17 such that a part of the sensor projects through opening 18. Slit 15 of the sensor is then directed outward and is oriented in a plane which includes spin axis 21 of the satellite. Another sun sensor 22, which has the same construction as sensor 10, and includes an annular slit 19 is similarly mounted on the artificial satellite 17 such that a part of the sensor projects through opening 39. However, annular slit 19 of sensor 22 is located in a plane that is oriented at an angle with respect to spin axis 21.

FIG. 3 shows the geometric and optical relationships between the spin axis 21 of the satellite 17 and slits 15 and 19 of the sun sensors 10 and 22, respectively. The centers of hypothetical circles, of which slits 15 and 19 form circumferential portions, are positioned at the origin 0, which is located on spin axis 21. Slit 15 is positioned in a plane which includes the spin axis 21 and a reference vector 24. Reference vector 24 emanates from origin 0 and is perpendicular to the spin axis 21. On the other hand, the slit 19 and the hypothetical circle of which it is a circumferential portion, lie in a plane which includes the reference vector 24, but is inclined at an angle I to a reference plane or surface 25 which includes the vector 24, but is perpendicular to spin axis 21. Thus, it can be seen that slits 15 and 19 are oriented at an angle i ($\pi/2 - I$) with respect to one another.

The intersection point of the hypothetical circles which include slits 15 and 19 coincides with the tip of reference vector 24, as shown in FIG. 3. At the intersection point, the circumferences of the two hypothetical circles which include slits 15 and 19 coincide. However, at any other point on their circumferences, the planes of the two hypothetical circles and the slits 15 and 19 are separated by an angle $a$, which can be used as a measurement of the orientation of satellite 17, as will be described in detail hereinafter.

An angle $b$ is defined by the angular relationship between a vector 28, which is directed from origin 0 toward sun 27, and a vector 29, which is parallel to spin axis 21.

It will be apparent that angle $a$ varies in proportion to variations in angle $b$. For example, when the angle $b$ increases, angle $a$ decreases, and vice versa. Angle $b$ can be calculated from the angle $i$ between slits 15 and 19 and from angle $a$ according to the following formula:

$$\cot b = \cot i \times \sin a$$

In operation, the satellite 17 rotates around spin axis 21 in a direction as shown with an arrow 26. When slit 19 is directed toward the sun 27, the sun's rays will pass through it to fall upon the origin 0, and similarly, when slit 15 is directed toward the sun, the sun's rays will pass through it to fall upon the origin 0. Accordingly, if a photo-electric converter such as a solar cell (not shown) is placed at the origin 0, it will generate sequential electric pulses in response to the brief light "pulses" falling upon it through slits 15 and 19 as satellite 17 rotates. The time interval between these electric pulses will be directly proportional to the angle $a$. Thus, the angle $a$ can be easily derived from the time interval between the pulses and the spin period of the satellite.

FIG. 4 shows the results of experimental measurements of the relationships between the angles $a$ and $b$ (using the formula stated above) for various angles $i$. It can be seen from FIG. 4 that as the angle $i$ between slits 15 and 19 becomes smaller, the range of values of angle $b$ which are measurable becomes larger. On the other hand, as shown in FIG. 5, the measuring error in angle $b$ ($\Delta b$), which is represented by ($\Delta b + \Delta b / \Delta i \Delta a$), becomes smaller as the angle $i$ between the slits becomes larger. Because of these relationships, the prior art sun sensing system described above has a significant defect in that if a wider measurable range of the angle $b$ is sought, the resultant measuring error will become larger. On the other hand, if measuring error is to be minimized, only a small range of variation in angle $b$ can be measured.

SUMMARY OF THE INVENTION

Accordingly, it is one object of this invention to provide a new, unique and novel sun sensing system which effectively eliminates the defect described hereinabove.

Another object of the invention is to provide a new, unique, and novel sun sensing system wherein three sun sensors are used, two of which are selectively employed to reduce the measuring error and to increase the measuring range.

Briefly, in accordance with one embodiment of the invention, three sun sensors are mounted on a flying body, each of which includes a slit for allowing the sun's rays to fall upon a photoelectric converter located within the flying body. The first sun sensor is mounted with a first slit positioned in a first plane which includes the spin axis of the flying body. The second sun sensor is mounted with a second slit positioned in a second plane inclined at a first angle to the spin axis of the flying body. The third sun sensor is mounted with a third slit positioned in a third plane inclined at a second angle to the spin axis of the flying body. There are also provided means for selectively responding to the outputs of different sensors depending upon the attitude of the satellite.

BRIEF DESCRIPTION OF THE DRAWINGS

The present invention will be more fully understood from the following description when taken in connection with reference to the accompanying Drawings, wherein:

FIG. 6 is a perspective view of an artificial satellite having sun sensors mounted thereon according to the instant invention;

FIG. 7 is a perspective view of an artificial satellite illustrating an alternative mounting configuration for sun sensors according to the instant invention;

FIG. 8 is a schematic diagram illustrating the geometric and optical relationships among the slits and the spin axis of the satellite of FIGS. 6 and 7;

FIGS. 12 and 13 are graphs illustrating the performance of the sun sensing system of the instant invention;

FIG. 14 is a block diagram illustrating an alternative embodiment of the logic network shown in FIG. 9;

FIG. 15 is a more detailed block diagram of the pulse distinguishing circuit of FIG. 14; and, FIGS. 16, 17, and 18 show waveforms illustrating the output of the circuit disclosed in FIG. 14.

DETAILED DESCRIPTION OF THE PREFERRED EMBODIMENTS

Figure 2:
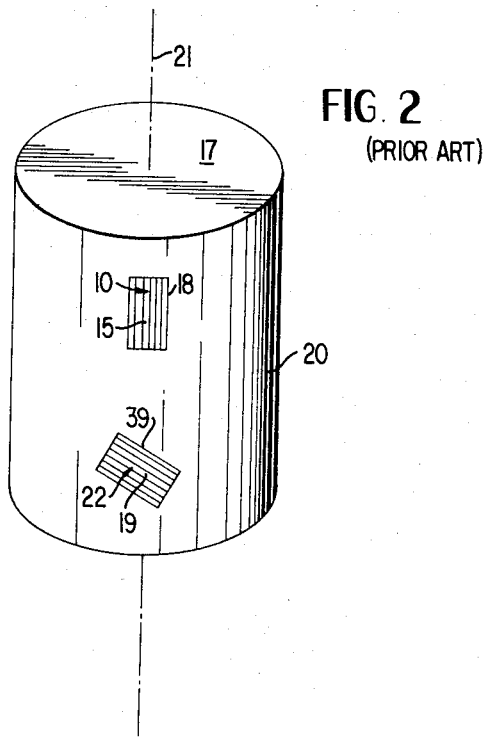
FIG. 2 is a perspective view of a prior art artificial satellite having a pair of sun sensors mounted thereon.

Referring now to the Drawings, wherein like reference numerals designate identical or corresponding parts throughout the views, and more particularly to FIG. 6 thereof, an artificial satellite 17 similar to that of FIG. 2 is shown as including three openings 18, 30 and 39 on the side wall thereof. The vertical arrangement of the openings is similar to that of FIG. 2 except for the inclusion of an intermediate opening 30. Three sensors 10, 31, and 22 are mounted in the openings 18, 30, and 39, respectively, in a manner similar to that of FIG. 2. To simplify the following description, sensor 10 will be referred to as the first sensor, sensor 31 will be referred to as the second sensor, and sensor 22 will be referred to as the third sensor. It will be observed that the second or intermediate sensor 31 has a slit designated 32.

Figure 3:
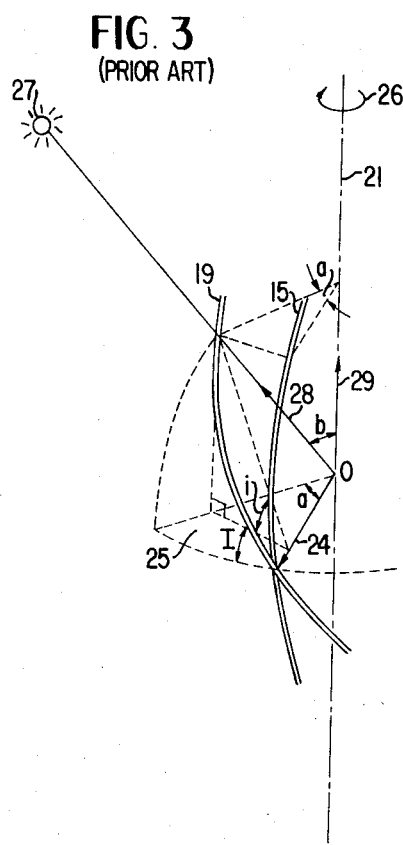
FIG. 3 is a schematic diagram illustrating the geometric and optical relationships among the slits and the spin axis of the satellite of FIG. 2.

The optical and geometric arrangements of the first, second and third slits 15, 32 and 19 of the first, second and third sensors 10, 31 and 22 are shown in FIG. 8, which is similar to FIG. 3 except for the fact that an additional hypothetical circle including the second slit 32 has been added between the hypothetical circles including the first and third slits 15 and 19.

In this way, the third slit 19 is inclined to the reference plane or surface 25 at a small angle, $I_1$, and the slit 32 is inclined to the surface 25 at an angle $I_2$ larger than the angle $I_1$. In other words, the included angle $i_1$ between the first and third slits 15 and 19 is larger than the included angle $i_2$ between the first and second slits 15 and 32.

Referring now to FIG. 7, the three sun sensors 10, 31 and 22 may alternatively be located in openings 18, 130 and 139 which are circumferentially rather than vertically spaced around the side wall of the satellite 17. In the FIG. 7 embodiment, the three slits 15, 32, and 19 possess the same angular relationship as in the FIG. 6 embodiment with respect to the spin axis 21 of the satellite 17, and thus the geometric and optical relationships of both embodiments are identical. However, a constant time delay corresponding to the circumferential distance between the centers of the adjacent slits is introduced into the FIG. 7 embodiment. This time lag does not create any problem in the measuring process because it is of constant value.

Figure 4:
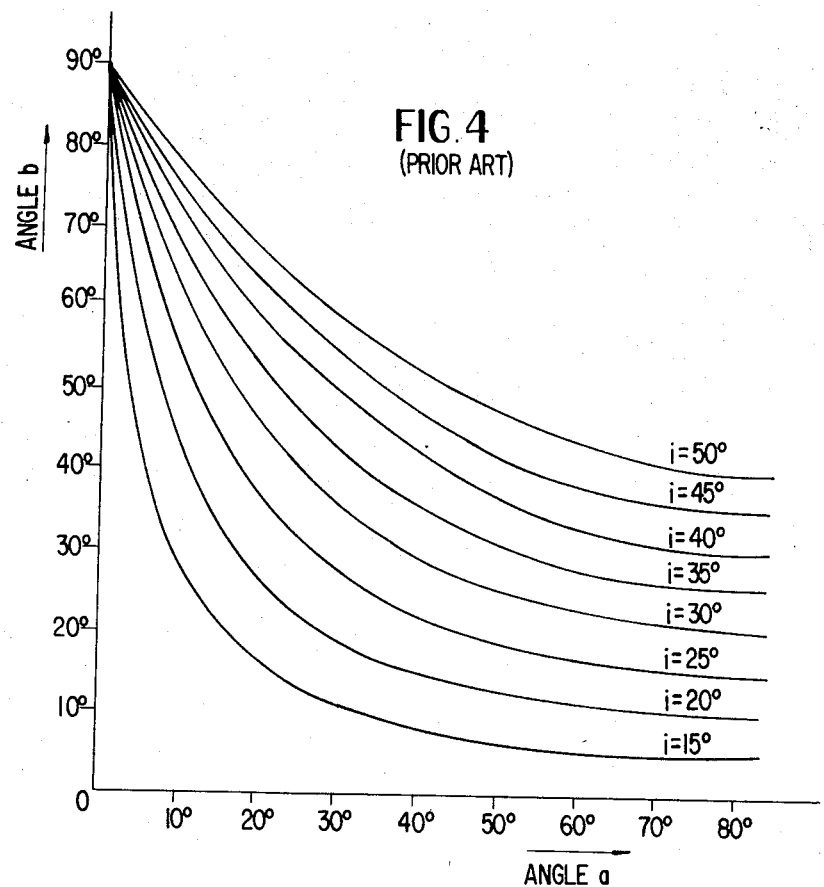
FIGS. 4 and 5 are graphs illustrating the performance of the prior art sun sensing system.
Figure 5:
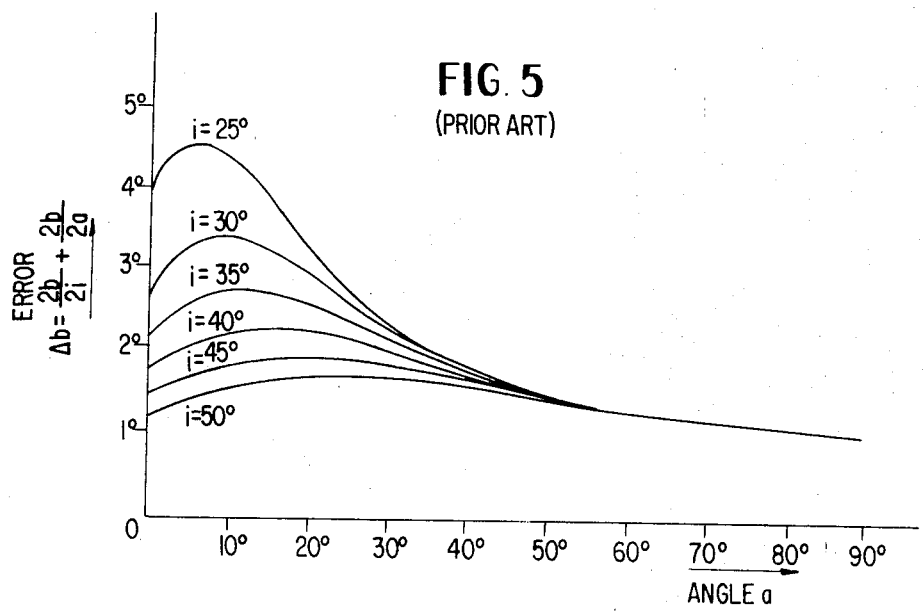

The purpose of adding an additional sun sensing element 31 to the prior art satellite configuration is clear from the teachings of the graphs of FIGS. 4 and 5. More particularly, according to the instant invention, sensors 10 and 22, having a large included angle $i_1$ between them are used to measure large values of angle $b$. But, to improve the accuracy of the system, and to reduce measuring error therein, sensors 10 and 31, having a small included angle $i_2$ between them, are used to measure small values of the angle $b$.

Figure 9:
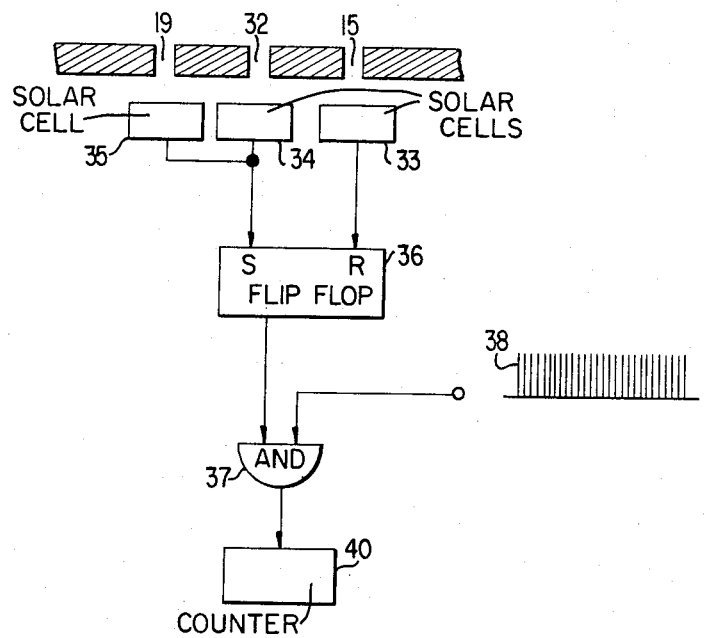
FIG. 9 is a block circuit diagram illustrating a logic network for processing outputs from the sun sensors.

Logic for implementing the instant invention is shown in FIG. 9. Three solar cells 33, 34 and 35 are provided for receiving the sun's rays through the first, second and third slits 15, 32, and 19, respectively. The outputs of cells 34 and 35 are connected to a set terminal of a flip-flop circuit 36. The output of cell 33 is connected to a reset terminal of the flip-flop. The output of flip-flop 36 is connected to one input of an AND gate 37. Clock pulses 38 are supplied to the other input thereof. A counter 40 is provided for counting the pulses 38 which pass through AND gate 37 during the existence of an enabling output from flip-flop 36.

Figure 10:
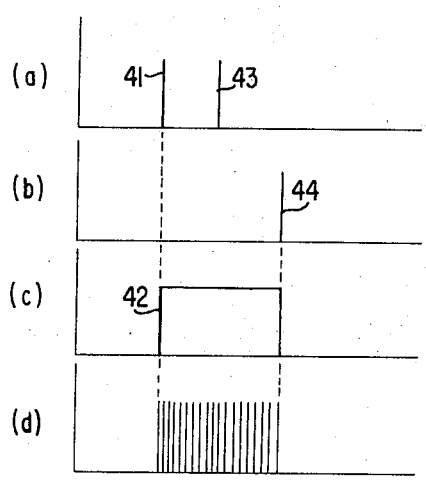
FIGS. 10 and 11 show output waveforms illustrating the functioning of the circuit of FIG. 9.

When angle b of FIG. 8 is large, the operation of the circuit of FIG. 9 can be understood by referring to FIG. 10.

In this case, the sun's rays will sequentially come through all the slits in the order 19, 32 and 15, assuming the satellite is spinning in a clockwise direction, and will illuminate cell 35 first. It will be observed that this order is the same for the embodiment of FIG. 6, as well as that of FIG. 7. Thus, as shown in FIG. 10a, cell 35 will generate a short output pulse 41 to set flip-flop 36. FIG.10c shows the output 42 of flip-flop 36. Secondly, when the second slit 32 is directed toward the sun, cell 34 will generate an output pulse 43. However, since the outputs of the cells 35 and 34 are both connected to the set terminal of the flip-flop 36, only cell 35, which is activated first, changes the state of the flip-flop. Finally, when slit 15 is directed toward the sun, cell 33 will generate an output pulse 44, as shown in FIG. 10b to reset the flip-flop 36. Thus, the output 42 from the flip-flop 36 is constant for the time interval between pulses 41 and 44. Thus, during this period, clock pulses 38 will be fed to the counter 40, as shown in FIG. 10d.

Figure 1:
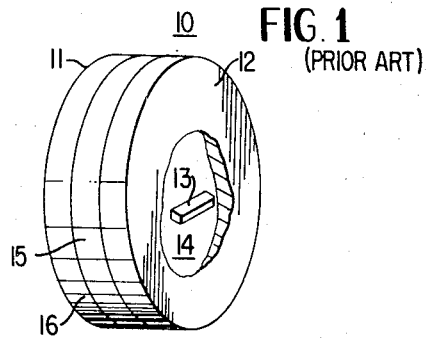
FIG. 1 is a perspective view, partly broken away, of a prior art sun sensor.
Figure 11:
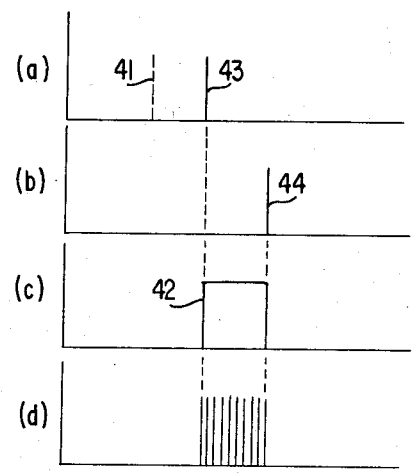

Once the angle b becomes suitably small, however, the sun's rays will no longer pass through the slit 19 due to the fact that the sensor 22 is constructed as shown in FIG. 1, and projects through the opening 39. Thus, as the angle b becomes suitably small, the projecting portion of the sensor 22 acts as a shield which prevents sunlight from entering the slit 19. In this case, the pulse 41 from the cell 35 does not occur, and the operation of the circuit is described by reference to FIG. 11. Accordingly, the flip-flop 36 will be set by pulse 43 from cell 34, the first cell to be illuminated, as shown in FIG. 11a. Flip-flop 36 will then be reset by pulse 44 from cell 33, as shown in FIG. 11b. Thus, the flip-flop 36 will generate an output pulse 42 as shown in FIG. 11c only for the time interval between pulses 43 and 44. Only during this interval will the clock pulses 38 be fed to counter 40, as shown in FIG. 11d. In this manner, sensing elements 10 and 33 are used to measure larger values of the angle b while sensing elements 10 and 32 are used to measure smaller values the angle b.

FIGS. 12 and 13 correspond to FIGS. 4 and 5, respectively. In FIG. 12, the solid line on a curve 45 shows the possible range of measurements of the angle b using the first and third slits 15 and 19 (sensors 10 and 22). In this case, the error $\Delta b$ becomes smaller as shown by a solid line on curve 46 of FIG. 13. Similarly, the solid line on a curve 47 of FIG. 12 shows the possible range of measurements of smaller values of the angle b using the first and second slits 15 and 32 (sensors 10 and 32). The error $\Delta b$ becomes smaller as shown by the solid line on curve 48 of FIG. 13. Thus, it will be understood from FIGS. 12 and 13 that according to the teachings of the instant invention measurements can be made over a wider range with greatly reduced error.

Referring now to FIG. 14, an alternative angle measuring circuit is shown which is similar in construction to that of FIG. 9, except that a pulse distinguishing circuit 49 is added between cells 33, 34, 35 and the flip-flop circuit 36.

The pulse distinguishing circuit 49 is shown in more detail in FIG. 15 as including a monostable multivibrator 50 connected to the outputs of the cells 33, 34, and 35. An inverter 51 is connected to the output of the multivibrator 50, and a ternary counter 52 is connected between the outputs of the cells 33, 34 and 35, and an OR gate 53. Inverter 51 is also coupled to OR gate 53. An AND gate 54 receives the outputs of OR gate 53 and of the cells 33, 34, and 35.

FIG. 16a which is similar to FIGS. 10a and 10b, shows the output pulses 44, 43, and 41 generated by the cells 33, 34 and 35. Output pulse 55 of monostable multivibrator 50 is shown in FIG. 16b, the pulse width thereof being chosen to be wider than the pulse interval between the pulses 41 and 43, and to be narrower than the pulse interval between the pulses 41 and 44. Inverter 51 generates an output pulse 56 as shown in FIG. 16c when the output of the multivibrator 50 ceases. FIG. 16d shows the output pulse 57 of the ternary counter 52, which will occur simultaneously with the pulse 44 of the cell 33. FIG. 16e shows outputs 58 and 59 of OR gate 53, while FIG. 16f shows output pulses 60 and 61 of the AND gate 54.

From FIG. 16, it can be seen that when pulse 41, caused by incident rays passing through slit 19 occurs, the second pulse 43, which is caused by incident rays passing through second slit 32, is effectively suppressed by the output 55 from the multivibrator 50. Accordingly, only the first and third slits 15 and 19 can produce the corresponding pulses 60 and 61 (FIG. 16f) from AND gate 54. The pulses 60 and 61 are fed to the flip-flop 36 as the set and reset pulses thereof. Thus, AND gate 37 functions to feed the clock pulses 38 to the counter 40 for the time interval between the pulses 60 and 61.

FIG. 17 illustrates the circuit operation for small angle measurements. In this case, the second slit 32 allows the incident rays to strike cell 34 first. Accordingly, there is no pulse 41 from cell 35.

As described above, the width of the pulse 55 from the multivibrator 50 is narrower than the time interval between the adjacent pulses 43 and 44, and thus pulse 44 is not suppressed by pulse 55. Thus, the counter 40 effects its counting operation for the time interval between the pulses 62 and 61 from AND gate 54.

In practice, the satellite may be rapidly rotating around its spin axis just after its launching. In this case, the pulse 44 of FIG. 18a, which is caused by incident rays passing through first slit 15, may be suppressed by the pulse 55 from the multivibrator 50 as shown in FIG. 18b.

Thus, the inverter 51 will not generate an output during the existence of the output pulse 55 of the multivibrator 50. However, the ternary counter 51 generates an output pulse 57 as shown in FIG. 18d. In this way, the pulses 41 and 44 from the first and third slits 15 and 19 are positively detected for measuring the attitude of the satellite.

It is clear from the description above that the aforesaid defects in the prior system can be effectively eliminated according to the teachings of the instant invention.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by letters patent of the United States is:

1. A sun sensing system for a flying body comprising:
a photoelectric converter mounted within said flying body,
said flying body rotating about an axis of spin,
a first sun sensor mounted on said flying body,
said first sun sensor including a first slit means for permitting the sun's rays to fall upon said photoelectric converter,
said first slit means lying in a first plane which includes said axis of spin,
a second sun sensor mounted on said flying body,
said second sun sensor including a second slit means for permitting the sun's rays to fall upon said photoelectric converter,
said second slit means lying in a second plane which is oriented at an angle to said first plane,
a third sun sensor mounted on said flying body,
said third sun sensor including a third slit means for permitting the sun's rays to fall upon said photoelectric converter,
said third slit means lying in a third plane which is at an angle to both said first and second planes, said angle between said first and third planes being smaller than said angle between said first and second planes; and, means included in said flying body for selecting outputs from one of said second and third sun sensors and for responding to outputs from said selected sun sensor and said first sensor.

2. A sun sensing system for a flying body as in claim 1, wherein:

said means for selecting includes a flip-flop circuit having a set terminal for receiving outputs from said second and third sun sensors and a reset terminal for receiving outputs from said first sun sensor.

3. A sun sensing system for a flying body as in claim 1, wherein:

said means for selecting includes a pulse distinguishing circuit, said pulse distinguishing circuit comprising, monostable multivibrator means for receiving outputs from said first, second and third sun sensors, inverter means coupled to said monostable multivibrator means for inverting the output thereof, ternary counter means coupled to said first, second, and third sun sensors for receiving the outputs thereof, an OR gate connected to said ternary counter means and to said inverter means for gating the outputs thereof; and, an AND gate coupled to said OR gate and to said first, second, and third sun sensors for gating the combined outputs thereof.

4. A sun sensing system for a flying body as in claim 3, wherein:

said second and third sun sensors generate output pulses separated by a first time interval, said first and second sun sensors generate output pulses separated by a second time interval; and, said monostable multivibrator generates an output pulse having a duration longer than said first time interval but shorter than said second time interval.

5. A sun sensing system as in claim 3, wherein:

said monostable multivibrator means inhibits outputs from said first and second sun sensors; and, said ternary counter generates an output pulse only when said outputs from said first and second sun sensors are inhibited by said monostable multivibrator.

* * * * *